(No Model.)
J. F. PARKS.
SEEDING MACHINE.
No. 504,362. Patented Sept. 5, 1893.
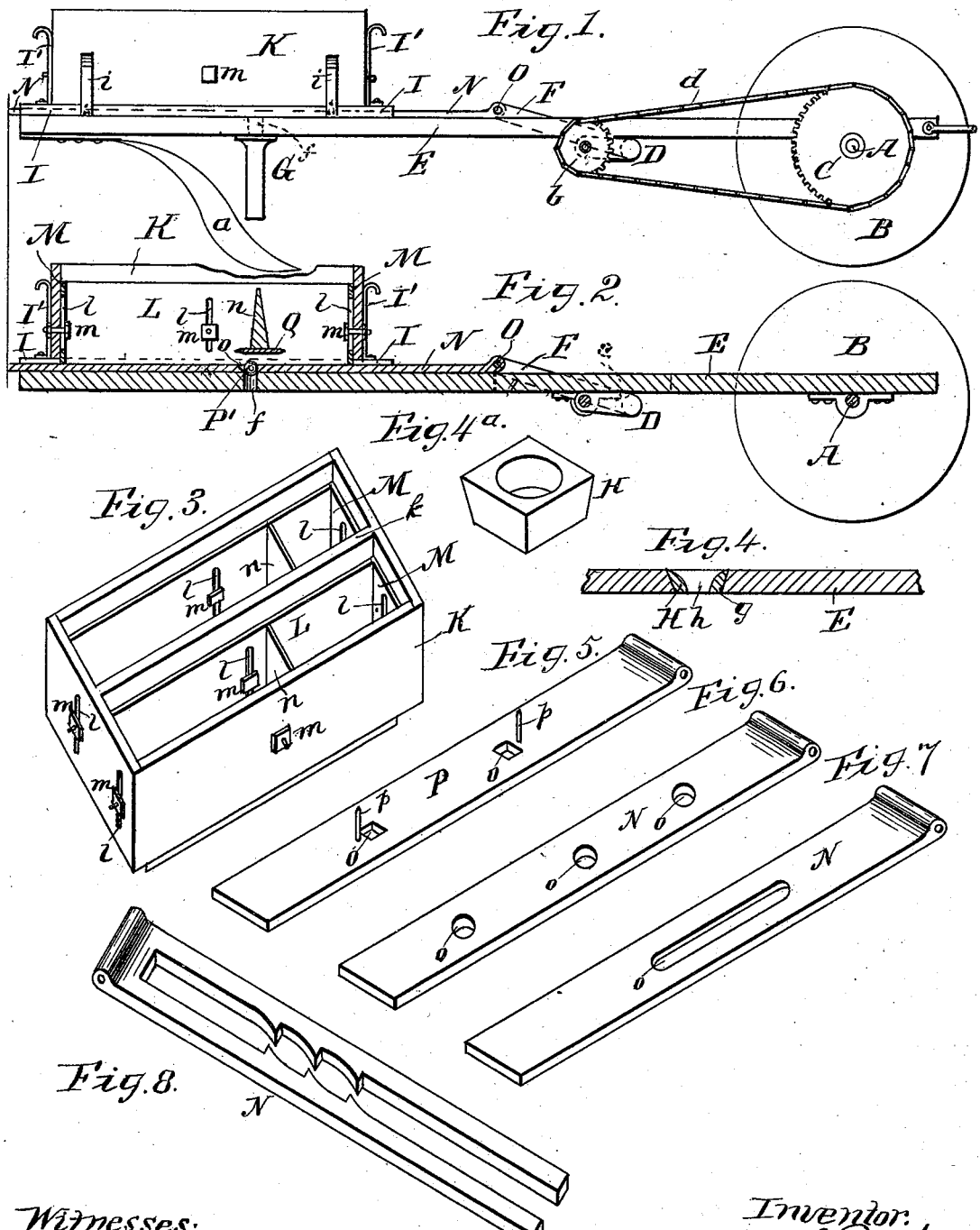
Witnesses:
R. Lunsford.
Edwin S. Clarkson
Inventor:
Jabel F. Parks
By C. F. Belt.
Attorney

UNITED STATES PATENT OFFICE.

JABLE F. PARKS, OF SANDHILL, TENNESSEE.

SEEDING-MACHINE.

SPECIFICATION forming part of Letters Patent No. 504,362, dated September 5, 1893.

Application filed April 15, 1893. Serial No. 470,494. (No model.)

*To all whom it may concern:*

Be it known that I, JABLE F. PARKS, a citizen of the United States, residing at Sandhill, in the county of Polk and State of Tennessee, have invented certain new and useful Improvements in Seeding-Machines, of which the following is a specification.

This invention relates to the class of seeders and planters, and its novelty will be fully understood from the following description and claims when taken in connection with the annexed drawings; and the object of the invention is to provide a seeding machine of simple, cheap, and durable construction to sow seed of any kind, in single or double row.

A further object of the invention is to provide a machine that will plant or sow seed of different kinds together or separately in one row, and that will sow seed of one or more kinds with fertilizer in another row.

A still further object of the invention is to provide a machine that will sow one or more kinds of seed, or one or more kinds of seed and fertilizer together or separately, in the same hill and row, or in separate hills or rows.

To effect these objects, the invention consists in the novel construction and arrangement of parts as will be hereinafter more fully described.

In the accompanying drawings forming part of this application: Figure 1 is a side elevation of my improved machine. Fig. 2 is a longitudinal sectional view. Fig. 3 is a perspective view of the hopper containing the adjustable inner hopper. Fig. 4 is a modification of the bottom of the machine, in section, showing one of the measuring blocks in place. Fig. 4ª is a detached perspective view of one of the measuring blocks. Fig. 5 is a perspective view of one of my seed feeding plates or slides. Fig. 6 is a perspective view of another form of seed feeding plate. Fig. 7 shows still another form of said plate, and Fig. 8 is a further modified form of seeding plate.

The same letters of reference denote the same parts throughout the several figures of the drawings.

The axle A upon which the land roller B and sprocket driving wheel C are located, is secured upon the front of the machine with the plow $a$, in the rear but the position of the axle and plow may be changed, one taking the place of the other when it is desired. Behind the plow may be secured a furrow coverer of ordinary construction, not shown. The sprocket driving wheel C imparts motion to the sprocket wheel $b$ secured to a crank shaft D, upon the body E of the machine by means of the drive chain $d$. The body E has a slot $c$ of sufficient size to allow the pitman F, and crank of the shaft D, free play in said body. The rear of the body E has grain apertures $f$ to which are connected grain or seed delivery tubes or spouts G. As shown in Fig. 4 instead of these apertures, there may be large holes $g$ made to receive seed discharge measuring blocks H, having an aperture $h$. Each of these blocks has an aperture of different size to accommodate different kinds of seed or fertilizer.

Between and upon either side of the apertures $f$ is a guide.

The two side bars I having springs $i$ are for the purpose of receiving between them the seed hopper K and holding it firmly upon the body E, while the middle guide bar I has like springs I'. This hopper K has a longitudinal partition $k$, and in each compartment are fitted side and end pieces L, and M, respectively, each piece having a slot $l$, through which pass bolts $m$, to secure said side and end pieces adjustably to the sides and ends of the seed hopper, thus forming an adjustable inner hopper. This inner hopper is provided so that it may be made to bear upon the seed feeding plates N, sufficiently to keep said plates hard down upon the body E, and to allow no space for the escape of seed except through the seed discharge apertures $f$. There may be one or more partitions $n$, in said inner hopper according to the number of kinds of seed to be sowed. The seed feeding plates N, are connected, one or two to the pitman F, by means of a pivot rod O. Each plate has a rounded end provided with an aperture to receive said rod, and the apertures $o$ in each plate made to a size and distance apart according to the seed to be sowed, that is, one machine is provided with a set of plates each having apertures to suit different kinds of seed. The guano or fertilizer feed plates P, are provided with stirring spikes $p$ for the purpose of keeping the material in the adjustable inner hopper from clogging. The weighted ball ejector P', is housed so as to engage the aperture f, as the plates N, are moved back and forth.

Another means for keeping the material in said frame, such as corn or similar large grain, from clogging or chocking the apertures in the plates and body, consists of a double pointed V shaped cut off Q, which is set into the bottom edge of one of the cross partitions of the adjustable inner hopper or it may be otherwise secured so as to come in contact with the seed or grain should it become hung in the aforesaid apertures, when it will force out the grain or push it in proper position to leave the seeding plates free. It will be observed that a feed plate having two apertures will feed seed from two separate compartments and deposit the seed in separate hills, and can also be arranged according to the number and length of the seed compartments, to take seed from separate compartments, that is, different seed, and deposit one or more kinds of seed in one and the same hill. It will further be observed that two plates with apertures differently arranged from each other, will feed seed of one or more kinds in the same hills of one row, while the hill in the opposite row may all be of one, or different kinds of seed. In place of the cut off Q, stiff bunches of hair or bristles may be used to accomplish the same purpose.

Having thus described my invention, what I claim as new, and desire to secure by Letters Patent, is—

1. The combination with a seeding machine of the character described, of the hopper having slotted ends, the adjustable inner hopper having slotted sides and ends, and the bolts engaging the slots in both of the said hoppers, substantially as and for the purpose set forth.

2. The body E, supported by a land roller and a furrow opener, the feeding plates located upon the body having seed-apertures, and operated by means of sprocket wheels and chain, the hopper K, having slotted ends, the springs for holding the hopper upon the said body, the inner hopper comprising the side and end pieces L and M, respectively each having a slot, and the bolts and nuts for adjustably securing the inner hopper in the said hopper K, the cross partition n, and the weighted ejector adapted to engage the said apertures in the said feed plates, substantially as and for the purpose set forth.

3. The combination with a seeding machine of the character described, the hopper K, the slotted pieces comprising the adjustable inner hopper, the cross partition with which the inner hopper is provided, the cut off Q, secured to the bottom of the said cross partition, and the weighted ejector, substantially as and for the purpose set forth.

In witness whereof I hereunto set my hand in the presence of two witnesses.

JABLE F. PARKS.

Witnesses:
W. T. REYNOLDS,
E. B. LUNERY.